United States Patent
Dalsgaard et al.

(10) Patent No.: US 9,026,058 B2
(45) Date of Patent: May 5, 2015

(54) MEASUREMENT CONFIGURATION AND REPORTING OF CSG CELLS IN CONNECTED MODE

(75) Inventors: Lars Dalsgaard, Oulu (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 775 days.

(21) Appl. No.: 13/260,193

(22) PCT Filed: Mar. 23, 2010

(86) PCT No.: PCT/IB2010/000653
§ 371 (c)(1),
(2), (4) Date: Sep. 23, 2011

(87) PCT Pub. No.: WO2010/109302
PCT Pub. Date: Sep. 30, 2010

(65) Prior Publication Data
US 2012/0015681 A1    Jan. 19, 2012

Related U.S. Application Data

(60) Provisional application No. 61/210,784, filed on Mar. 23, 2009.

(51) Int. Cl.
*H04B 17/00* (2006.01)
*H04W 48/08* (2009.01)
(Continued)

(52) U.S. Cl.
CPC .............. *H04W 48/08* (2013.01); *H04W 24/10* (2013.01); *H04W 84/045* (2013.01)

(58) Field of Classification Search
CPC ........................... H04W 24/10; H04W 84/045
USPC ...................................................... 455/67.11
See application file for complete search history.

(56) References Cited

U.S. PATENT DOCUMENTS

| 2009/0047968 A1* | 2/2009 | Gunnarsson et al. ......... 455/446 |
| 2010/0130215 A1* | 5/2010 | Jung et al. .................... 455/450 |

(Continued)

FOREIGN PATENT DOCUMENTS

| WO | 2009/001269 A2 | 12/2008 |
| WO | 2009/044318 A2 | 4/2009 |
| WO | 2010/049911 A2 | 5/2010 |

OTHER PUBLICATIONS

International Search Report and Written Opinion received for corresponding Patent Cooperation Treaty Application No. PCT/IB2010/000653, dated Jun. 24, 2010, 15 pages.

(Continued)

*Primary Examiner* — David Bilodeau
(74) *Attorney, Agent, or Firm* — Squire Patton Boggs (US) LLP

(57) ABSTRACT

A network sends to a user equipment UE a range indicator by which a private cell can be distinguished from a non-private cell, a first indicator that indicates whether or not to report private cells in a measurement report, and a second indicator that indicates which private cells are to have their measurements reported. The UE receives these, in an embodiment all in a same message. The UE uses the second indicator to identify at least one cell to report and the received range indicator to distinguish private cells from non-private cells; measures a signal from the identified at least one cell which is determined by the range indicator to be a private cell; and sends to the network a measurement report that comprises a measurement indication from the identified and determined at least one private cell. The network receives from the UE that measurement report.

20 Claims, 5 Drawing Sheets

(51) Int. Cl.
*H04W 24/10* (2009.01)
*H04W 84/04* (2009.01)

(56) References Cited

U.S. PATENT DOCUMENTS

| | | | |
|---|---|---|---|
| 2010/0190488 A1* | 7/2010 | Jung et al. | 455/424 |
| 2010/0272086 A1* | 10/2010 | Jung et al. | 370/338 |
| 2010/0298017 A1* | 11/2010 | Dalsgaard et al. | 455/507 |
| 2010/0323627 A1* | 12/2010 | Alanara | 455/67.11 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description, Stage 2 (Release 8)", Section 10.5, 3GPP TS 36.300 V8.6.0, Sep. 2008, pp. 39-63.

"R2-087427: Change Request", 3GPP TSG-R2, Meeting #64, Prague, Czech Republic, Section 10.5.1, Nov. 10-14, 2008, 4 Pages.

"R2-08XXXX: Email discussion on the need of CSG cell Specific PCIs", 3GPP TSG-RAN WG-2, Meeting #62, Kansas City, Missouri, United States, May 5-9, 2008, 5 Pages.

"R2-095356: Change Request", 3GPP TSG-RAN2, Meeting #67, Shenzhen, China, Aug. 24-30, 2009, 6 Pages.

"3rd Generation Partnership Project; Technical Specification Group Radio Access Network; Evolved Universal Terrestrial Radio Access (E-UTRA), Radio Resource Control (RRC); Protocol specification, (Release 8)", 3GPP TS 36.331 V8.4.0, Dec. 2008, 198 Pages.

* cited by examiner

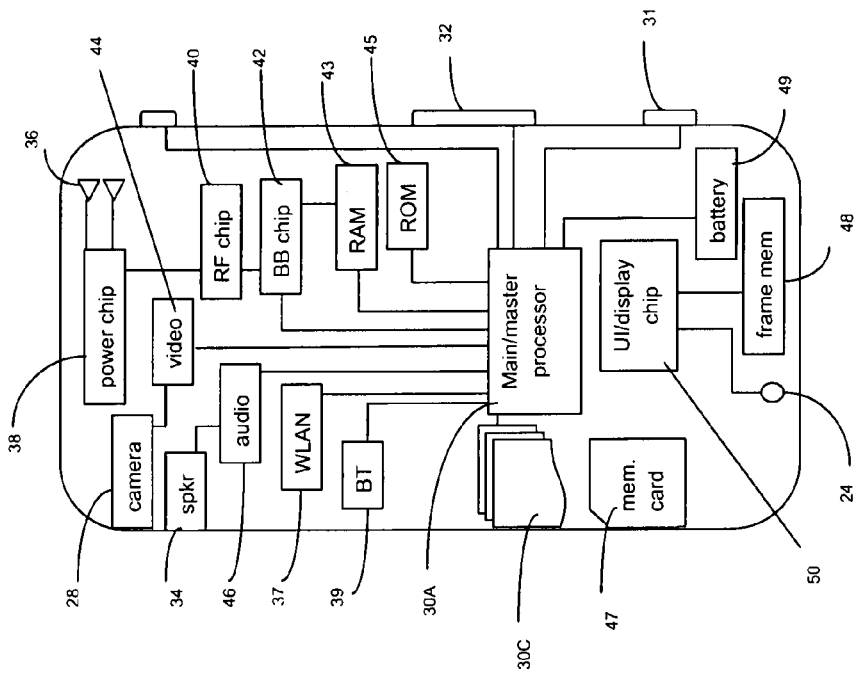
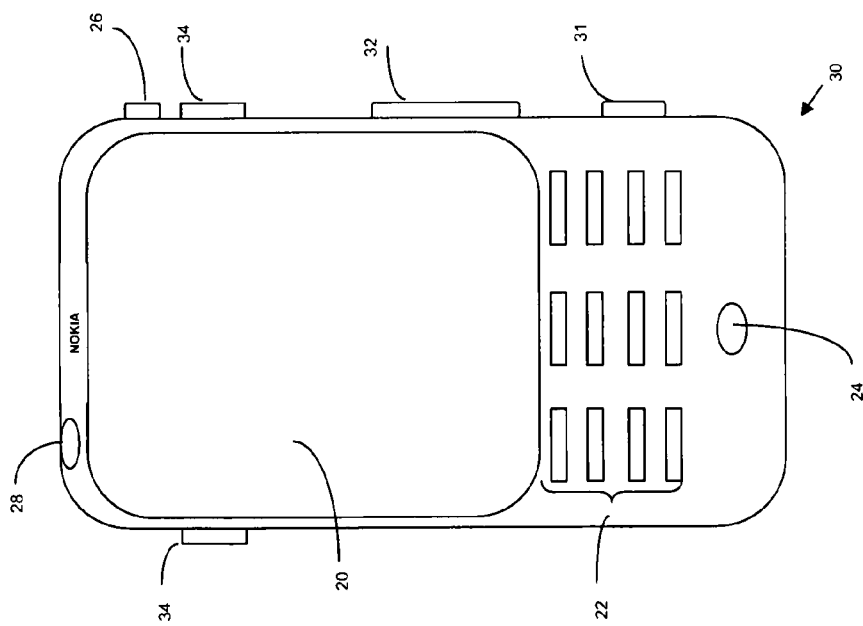
Fig 5B

MEASUREMENT CONFIGURATION AND REPORTING OF CSG CELLS IN CONNECTED MODE

RELATED APPLICATION

This application was originally filed as PCT Application No. PCT/IB2010/000653, filed Mar. 23, 2010, which claims priority benefit from U.S. Provisional Patent Application No. 61/210,784, filed Mar. 23, 2009.

TECHNICAL FIELD

The exemplary and non-limiting embodiments of this invention relate generally to wireless communication systems, methods, devices/apparatus and embodied computer programs, and more specifically relate to measurement reports of closed subscriber groups/private network cells and configuring for such measurement reports.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Following are some acronyms used in the description below:
- BCH broadcast channel
- CSG closed subscriber group
- eNB evolved NodeB (base station)
- E-UTRAN evolved UTRAN (3.9 G or LTE)
- GERAN GSM EDGE radio access network
- GSM global system for mobile communications
- LTE long term evolution
- MME mobility management entity
- OFDM orthogonal frequency division multiple access
- PCI physical cell identifier or physical cell identity
- RRC radio resource control
- UMTS universal mobile telecommunications system
- UTRAN UMTS terrestrial radio access network (3G)
- UE user equipment (also termed mobile terminal MT)
- WLAN wireless local area network
- WCDMA wideband code division multiple access Adjacent cell measurements are carried out in cell-based telecommunications systems. As known to those skilled in the art, the adjacent cell measurements are the basis for the handover and cell reselection decisions. The user equipment UE (mobile terminal), measures signal quality (such as signal strength, bit error rate BER, bit error probability BEP, or other signal quality parameters in use) from its serving cell and also from adjacent cells and reports these to the network in a measurement report. The measurement reports may be sent at regular intervals or in reply to a request/command from the network. The UE typically determines which cells are adjacent, and more narrowly which ones to measure, based on neighbor lists which in the prior art are delivered to the UEs on one or more control channels of the wireless system or by dedicated signaling. The neighbor lists contain the necessary data about the adjacent cell so that the UE can find the neighbor cells easily and efficiently with reference to the list stored in its local memory.

E-UTRAN is developing to include more network cells than previous systems, including private networks (a single cell or group of cells) which E-UTRAN terms closed subscriber group CSG network cells with home eNBs (node B's or base stations). These are also known more generically as private networks, and are available for traffic (data and/or voice) only to those UEs specifically allowed access (e.g., registered as subscribers or guests) in the private network's subscriber group. Other wireless systems (GERAN, GSM, UTRAN, WCDMA, OFDM) are also proceeding in this general direction incrementally as more functionality is shifted from the radio network controller RNC to the base stations BSs. An individual private network may cover a relatively large geographic area with multiple cells (e.g., a corporate network or a large university campus), or may consist of a single home node B. Below, the term whitelist or CSG allowed list is used to refer to a list of private (CSG) cells for which a particular UE has access rights. A CSG cell can only be accessed by UEs which belong to the CSG associated to that cell, which are member UEs or guest UEs typically. These teachings relate to the UE measurement reporting aspects of the CSG concept.

The CSG layer refers to the layer formed by the CSG cells, and the macro layer refers to the layer formed by the non-CSG cells (i.e. regular cells for which no CSG is defined). A CSG subnet refers to cells with continuous coverage associated to the same CSG. The UEs which make measurement reports are in the active state, termed in E-UTRAN as the RRC connected state, which is opposite the idle state. The RRC connected state is one in which there is a radio bearer assigned to the UE, a bearer which may or may not be maintained across a handover of the UE from one cell to another.

Current versions of the E-UTRAN Release 8 (Rel-8) specification do not address the case of UE mobility between a macro cell (any cell of the macro or non-CSG network) and CSG cells while the UE is in the RRC connected state. Reference in this regard may be had to 3GPP TS 36.331 v8.4.0 (2008-12), Radio Resource Control (RRC); Protocol Specification (Release 8). The various possible UE scenarios while in the RRC connected state must be properly planned for in order to enable UE mobility while in the RRC connected state between the macro cells and any CSG cells and vice versa.

Two co-owned references are relevant at least in part to this topic:
- International Patent Application PCT/IB2008/053923, filed internationally on 25 Sep. 2008 and entitled "Closed Subscriber Group Measurement Reporting", describes that a UE which sends to its (Macro) serving access node a measurement report of a private (CSG) cell also sends an identifier for that private cell, which in one specific embodiment may be a short tracking area ID which it knows a broadcast channel of a cell adjacent to the private cell.
- International Patent Application PCT/IB2008/052457, published as WO 2009/001269, is directed to signaling between mobile terminal and network in the presence of private cells/CSGs. This document describes various means by which a UE receives an indication that a cell is private. The UE then excludes measurements of that private cell from its measurement reports sent to the macro network if that private cell is not on the UE's neighbor white list.

SUMMARY

In accordance with a first aspect the exemplary embodiments of the invention provide a method comprising: sending to a user equipment a range indicator by which a private cell can be distinguished from a non-private cell, a first indicator that indicates whether or not to report private cells in a measurement report, and a second indicator that indicates which private cells are to have their measurements reported; and receiving from the user equipment a measurement report that comprises a measurement indication from at least one private cell that is indicated by the second indicator.

In accordance with a second aspect the exemplary embodiments of the invention provide a computer readable memory storing a program of computer readable instructions that when executed by at least one processor result in actions comprising: sending to a user equipment a range indicator by which a private cell can be distinguished from a non-private cell, a first indicator that indicates whether or not to report private cells in a measurement report, and a second indicator that indicates which private cells are to have their measurements reported; and receiving from the user equipment a measurement report that comprises a measurement indication from at least one private cell that is indicated by the second indicator In accordance with a third aspect the exemplary embodiments of the invention provide an apparatus comprising at least one processor and at least one computer readable memory storing a program of computer executable instructions. The at least one processor is configured with the at least one computer readable memory and program of computer executable instructions to cause the apparatus to perform at least: sending to a user equipment a range indicator by which a private cell can be distinguished from a non-private cell, a first indicator that indicates whether or not to report private cells in a measurement report, and a second indicator that indicates which private cells are to have their measurements reported; and receiving from the user equipment a measurement report that comprises a measurement indication from at least one private cell that is indicated by the second indicator.

In accordance with a fourth aspect the exemplary embodiments of the invention provide a method comprising: receiving from a network a range indicator for a private cell, a first indicator that indicates to report private cells in a measurement report, and a second indicator that indicates which private cells are to have their measurements reported; using the second indicator to identify at least one cell to report; using the received range indicator to distinguish private cells from non-private cells; measuring a signal from the identified at least one cell which is determined by the range indicator to be a private cell; and sending to the network a measurement report that comprises a measurement indication from the identified and determined at least one private cell.

In accordance with a fifth aspect the exemplary embodiments of the invention provide a computer readable memory storing a program of computer readable instructions that when executed by at least one processor result in actions comprising: receiving from a network a range indicator for a private cell, a first indicator that indicates to report private cells in a measurement report, and a second indicator that indicates which private cells are to have their measurements reported; using the second indicator to identify at least one cell to report; using the received range indicator to distinguish private cells from non-private cells; measuring a signal from the identified at least one cell which is determined by the range indicator to be a private cell; and sending to the network a measurement report that comprises a measurement indication from the identified and determined at least one private cell.

In accordance with a sixth aspect the exemplary embodiments of the invention provide an apparatus comprising at least one processor and at least one computer readable memory storing a program of computer executable instructions. The at least one processor is configured with the at least one computer readable memory and program of computer executable instructions to cause the apparatus to perform at least: receiving from a network a range indicator for a private cell, a first indicator that indicates to report private cells in a measurement report, and a second indicator that indicates which private cells are to have their measurements reported; using the second indicator to identify at least one cell to report; using the received range indicator to distinguish private cells from non-private cells; measuring a signal from the identified at least one cell which is determined by the range indicator to be a private cell; and sending to the network a measurement report that comprises a measurement indication from the identified and determined at least one private cell.

BRIEF DESCRIPTION OF THE DRAWINGS

FIG. 5B shows a more particularized block diagram of a user equipment such as that shown at FIG. 5A.

DETAILED DESCRIPTION

Figure 1:
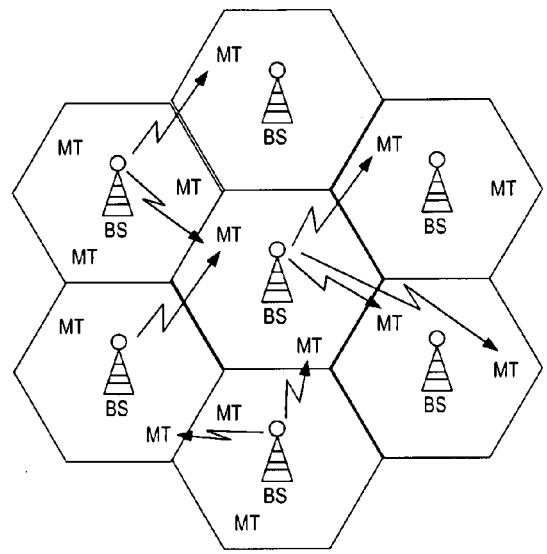
FIG. 1 is a schematic representation of a cellular telecommunications system showing a cluster of adjacent cells with mobile terminals MT in each, where any of the cells may restrict access to some of the depicted MTs.
Figure 2:
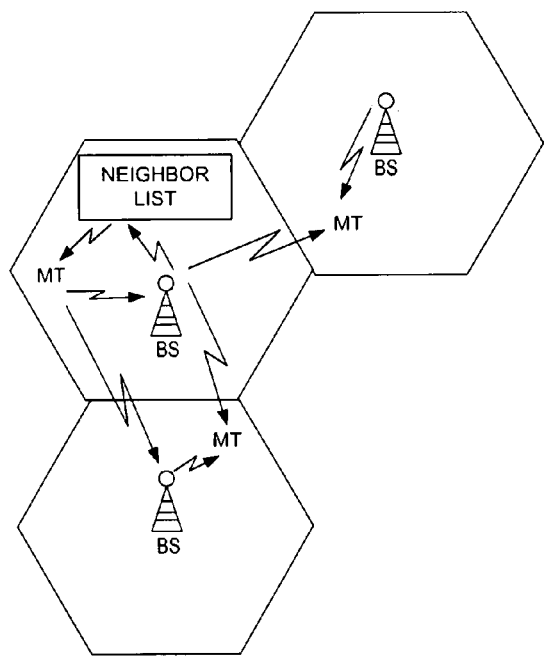
FIG. 2 is a schematic representation similar to FIG. 1 where a MT maintains in a local memory a neighbor list of information for other adjacent/neighbor cells.

FIG. 1 shows a cluster of cells each with a base station BS (also termed an eNB or access point or access node) and a plurality of mobile terminals (MTs, also known as user equipments UEs). Any particular one of the MTs/UEs may be in or moving toward or moving adjacent to a private network or CSG cell (sometimes referred to as a Home-eNB) for which it may or may not have access rights and consequently may or may not be granted access if it tries to do so. At FIG. 2 is a neighbor list that the MT/UE maintains in order to avoid excessive measuring and searching for inter-frequency and inter-RAT (inter-radio access technology, such as between E-UTRAN and GSM) cells. A private network/CSG may span one or more cells. While the exemplary embodiments detailed below are in the context of the EUTRAN system, that is simply to give more particularized examples; EUTRAN is not a limitation to the teachings herein.

Following reflect two different scenarios or use cases of UE mobility between macro and private cells while in the RRC connected mode. In a first use case, CSG cells are deployed on same carrier frequency (or frequency layer) as the macro cells. In the second use case, the CSG cells are deployed on separate dedicated carrier frequency.

For the first use case when the CSG cells are deployed on the same frequency layer as the macro cells (also termed a shared carrier case), the UE can know from the physical cell identifier PCI split information whether the identified cell is a CSG cell or not. In current versions of E-UTRAN (e.g., 3GPP TS 36.331 v8.4.0), an information element known as CSG-PCI-Range may be broadcasted in a system information block (SIB or SIBx). Specifically, it is mandatory for the CSG cell to broadcast this information while it is optional for the macro cell to broadcast it. Using this CSG PCI range information, the UE can potentially filter those CSGs whose PCI does not match any PCI from its stored information on allowed CSG cells, those in the neighbor list/white list stored in its local memory. Whether or not any particular UE has a CSG allowed list (those CSGs which it is allowed to access), either UE can identify both CSG and non-CSG cells in this manner using the PCI range information, assuming the shared carrier case.

For the second use case when the CSG is deployed on a dedicated carrier, it is the current understanding in E-UTRAN discussions that either the UE has stored information about the carrier frequency on which the CSG is deployed (i.e. it is not broadcasted for the idle mode case) or the network directly configures the UE to include the carrier frequency in the measurement command (in the RRC connected mode). Regardless of the mechanism by which the UE gets the CSG frequency, it remains unclear how to handle the measurement configuration and reporting of CSG cells.

Now are detailed exemplary implementations for how to enable configuration and reporting of cells belonging to a closed subscriber group (CSG). Consider there are three deployment scenarios listed below:
1) Reporting when UE has no CSG allowed list (and CSG is deployed on a shared carrier with the macro serving cell).
2) Reporting when UE has CSG allowed list and dedicated CSG carrier frequency is configured by the macro eNB (CSG is deployed on a dedicated carrier).
3) Reporting when UE has CSG allowed list but the dedicated CSG carrier is not configured by the macro eNB (CSG is deployed on a dedicated carrier).

Note that the first deployment scenario in the listing immediately above corresponds to the first use case detailed previously in which there is a shared carrier between the macro serving cell and the CSG cell, whereas the second and third scenarios in the listing immediately above correspond to the second use case detailed previously in which the CSG cell uses a dedicated carrier.

For the first deployment scenario listed above, according to an exemplary embodiment of the invention the eNB can distribute the PCI range information (CSG-PCI-Range information element in E-UTRAN), and for example this distribution may be in the measurement configuration message. Based on this information the UE can then determine whether an identified cell is a CSG cell or not. Having this information the UE can include or exclude from its measurement reports it makes to the macro cell any measurements of the CSG cell, according to macro network instructions (e.g., don't report, report once, report periodically). Further details as to whether to include or exclude CSG cell measurements in its measurement report to the macro cell may be seen at International patent application PCT/IB2008/053923, referenced above.

Consider again the CSG-PCI-Range information. In an exemplary embodiment, the UE indicates to the network (macro eNB) that it does not have this range information for the CSG. Not all UEs need this information, so by example only those UEs which have a locally stored CSG allowed list but which do not also have the PCI Range information for their CSGs would send such an indication to the network. In response the network then sends a measurement configuration message that includes the needed CSG-PCI-Range information. This is not a system-wide configuration; it is directed to only those UEs which have requested it. One technical effect of this exemplary implementation is that the eNB need not know or keep track of the UEs' capability for CSG (e.g., whether or not the UE has a CSG allowed list).

For the second deployment scenario listed above, according to an exemplary embodiment of the invention the n'etworkleNB indicates to the VE in the measurement configuration message whether a carrier frequency is-a dedicated CSG carrier frequency. Hereby the VE can act accordingly. Specifically, for the case where the VE has no CSG allowed list in its local memory the VE does not need to search for CSG cells on the dedicated carrier, whereas for the case where the VE does have a CSG allowed list in its local memory the UE will search for CSG cells from its list on that dedicated carrier. One technical effect of this is that when the macro eNB does not have knowledge about the VE's CSG allowed list status the result is the same; the VE checks whether it has a CSG list and acts accordingly and the macro eNB need not track which VE has a list and which does not. An additional technical effect of including the dedicated CSG carrier into the measurement configuration is that measurement reporting is simpler to implement because the existing measurement format (e.g., that defined at 3GPP TS 36.331) between VE and macro eNB can be reused.

For the third deployment scenario listed above, according to an exemplary embodiment of the invention it is left to the UE-side implementation (e.g., UE internally-stored algorithms) for searching and identifying CSG cells on the dedicated carrier. However, once the UE searches for and identifies a CSG, there will be a need for that UE to be able to report any potentially identified CSG cells since they may be accessible to that UE, for example for a handover from the macro cell. But current E-UTRAN specifications do not have a mechanism for the UE to report that dedicated CSG carrier since the macro eNB does not include that dedicated CSG carrier in the UE's measurement configuration. According to these teachings are three exemplary embodiments to address this shortfall in current specifications. In a first exemplary embodiment there is defined an information element for this purpose, termed measurement identifier or MeasID. In a second exemplary embodiment there is added a new field in the current E-UTRAN measurement report for the UE to report any additional (CSG) cells or dedicated carriers/frequencies that are not configured by the macro cell. And in a third exemplary embodiment the UE will use the existing message from the procedure of reporting CGI (cell global identity).

In a specific implementation of the third exemplary embodiment above, the measurement report is sent if the UE is configured to report CGI of a given cell on a frequency carrier with a given PCI (or other identifier for other wireless systems). In this implementation, the UE re-uses the same CGI report format for the measurement report of the CSG cell(s) that it sends. One technical advantage of this exemplary embodiment is that there is no need to define a new measurement report format. Alternatively, the UE need not be configured to report CGI but will simply re-use the format for the CSG measurement report. Currently, the format of the CGI measurement report does not make it possible to include CSG ID. If that format were not modified, the UE would include the CGI of the CSG in its measurement report and the eNB would then determine from the received CGI the matching CSG ID, for example by contacting the target CGI itself which returns its CSG ID. If the CGI measurement report were modified, the UE can simply include the CSG ID in the modified-format CGI measurement report format.

The above various implementations can be summarized as follows. For all cases the macro eNB provides to the UE two indications: a first indication as to whether or not the UE shall include CSG cells in its measurement report; and a second indication of how the UE is to identify those CSG cells that it reports, if in fact the first indication tells the UE to report. Reporting any CSG is then conditional on both the first indication telling the UE to report CSGs, and on the CSG satisfying the condition or search criteria set forth by the second indication. The second indication may then be considered an indication or filter that tells the UE how to identify those CSGs it is to measure and report to the macro eNB.

In an exemplary embodiment, the second indication informs the UE to report measurements on CSGs whose PCI matches a CSG in its locally stored CSG-allowed list (whitelist, those CSGs for which the UE can potentially gain access via being a member or an allowed guest). In a second exemplary embodiment, the second indication informs the UE to report measurements on CSGs whose cell identifier (CSG ID) matches a CSG ID in its locally stored CSG-allowed list. Either of these two embodiments is enabled by a new field included in the measurement configuration message from the macro eNB to the UE which sends the measurement report.

In a third exemplary embodiment, the second indication informs the UE to report measurements on only those CSGs whose CSG ID has been identified, regardless of whether or not that CSG ID matches any in the UE's locally stored CSG-allowed list. In the measurement report that the UE then sends under this third exemplary embodiment, the UE can include in one implementation an indicator that tells the macro cell whether or not the reported CSG cell is also one that matches an entry in the UE's locally stored whitelist e.g., a match indicator, which can be as small as a single bit). In another implementation the UE includes in this measurement report the entire CSG ID of the CSG being reported. This latter implementation is enabled by extending the measurement report format to include an additional field for the CSG ID.

Whether the UE includes in its measurement report the reported CSG ID or not may simply depend on the measurement reporting format chosen by the macro eNB. If the eNB knows from the report that the reported cell is a CSG cell (e.g. from the MeasID information element) and UE only reports CSG which matches an entry in its CSG allowed list (the first or second embodiments), then the existing reporting format should be sufficient for the eNB to fully identify the CSG being reported. Otherwise there would be a need to include new fields as indicated above in the measurement report that the UE sends.

Figure 3:
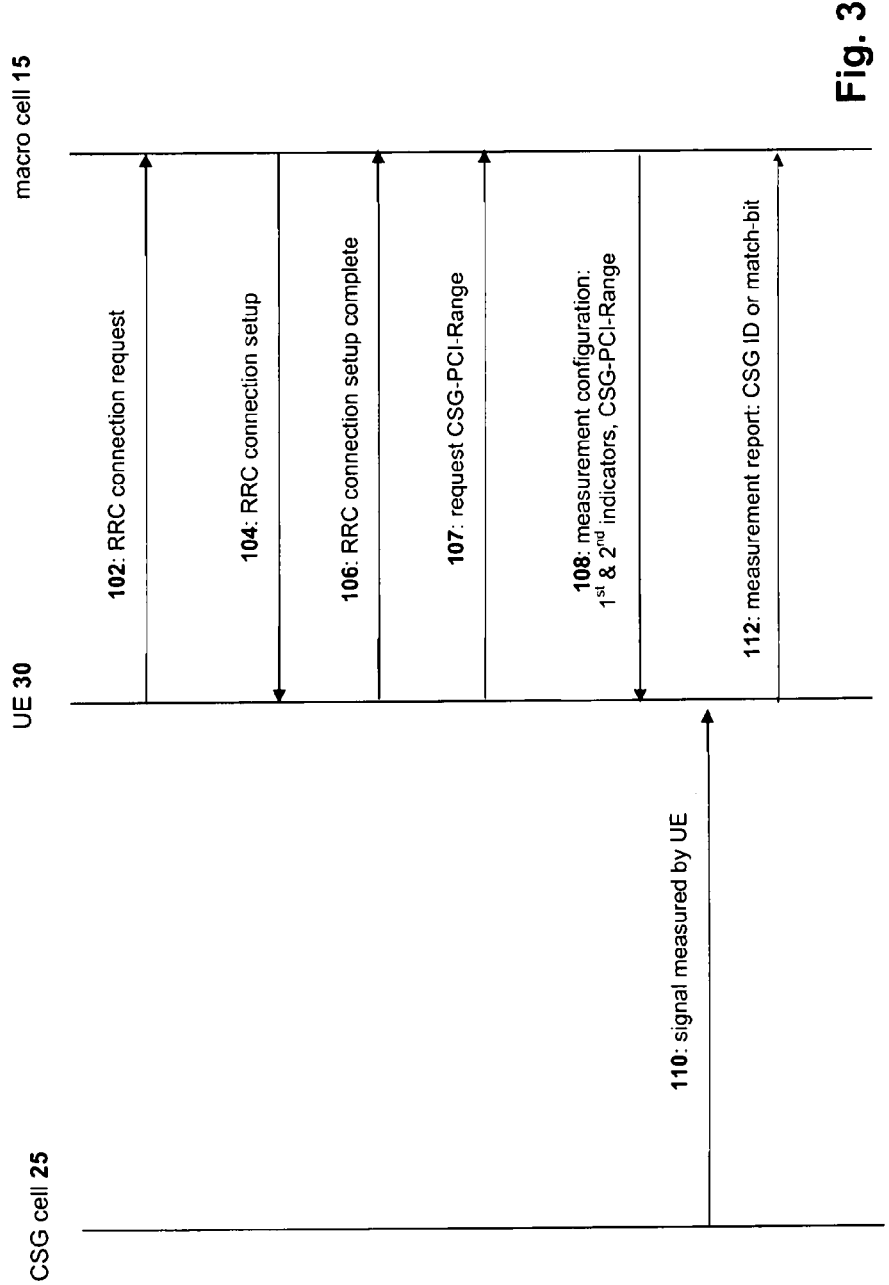
FIG. 3 is a signaling diagram illustrating signaling between a UE and a macro eNB according to an exemplary embodiment of the invention.

The above is shown by signaling diagram at FIG. 3. At 102 the UE 30 sends to the serving/macro eNB 15 a RRC connection request. At 104 the serving/macro eNB 15 sends to the UE 30 a RRC connection setup message, and at 106 the UE sends to the macro/serving eNB 15 a RRC connection setup complete message. At 107 the UE sees that it does not have the PCI range for a CSG that it needs, and sends to the network a request for that range information. At 108 the serving/macro eNB 15 sends to the UE 30 a measurement configuration message, which includes reporting criterion, measurement IDs, quantity configurations, and measurement gaps. Additionally, this message 108 also carries the first indicator telling the UE 30 whether or not to measure any CSGs it sees. Note that this indicator is for CSGs other than any specifically identified by the measurement IDs in this message. Message 108 also carries the second indicator, which tells the UE how to identify those CSGs which are to be reported as commanded by the first indicator. The measurement configuration message 108 also carries the CSG-PCI-Range information element by which the UE can distinguish private cells from macro cells, and which was requested at 107.

The UE uses the first and second identifiers to find at least one CSG, then measures a signal 110 from that identified CSG and sends a measurement report 112 to the macro/serving eNB 15 which has, in addition to the measurement from the specifically identified cells (those for whom the eNB provided in message 108 the measurement ID), also the measurement parameters for the CSG cell that is identified by the second indicator and measured from signal 110.

Now consider some further implementation details for various of the exemplary embodiments noted above. For the case where the UE 30 has no CSG allowed list (and the CSG is deployed on shared carrier), the eNB 15 can distribute the CSG-PCI-Range information in the measurement configuration message 108 as noted at FIG. 3. Based on this information the UE 30 can determine whether an identified cell is a CSG cell or not. Having this information the UE can include or exclude the CSG cell from its measurement report according to network instructions (e.g., report CSG cells or not; see for example the above referenced and co-owned International Patent Application PCT/IB2008/053923). One specific implementation of this embodiment is for the eNB 15 to include the CSG PCI-Range information into the relevant measurement object (measobjectX—e.g. MeasObject-EUTRA information element) in the MeasID of the measurement configuration message 108.

For the case where the UE 30 has a locally stored CSG allowed list and the dedicated CSG carrier frequency is configured by the serving/macro eNB 15, in a specific implementation the macro network 15 indicates in the measurement configuration message 108 also whether a carrier frequency is a dedicated CSG carrier frequency. Hereby the UE can read this bit (or bits) and act accordingly—i.e. if the UE 30 has no CSG allowed list the UE 30 does not need to search for cells on the carrier while on the other hand if the UE 30 has a CSG allowed list it should. This is useful in the case when the serving/macro eNB 15 does not have knowledge about the UE's CSG allowed list status. Including the dedicated CSG carrier into the measurement configuration message 108 has the benefit of making measurement reporting easy since the existing measurement format can be reused. In a specific implementation to enable this aspect of the invention the serving/macro eNB 15 includes a new 'CSG-Indicator' bit into the relevant measurement object (measobjectX—e.g. MeasObjectEUTRA information element) in the MeasID of the measurement configuration message 108.

For the case where the UE 30 has a locally stored CSG allowed list but the dedicated CSG carrier is not configured by the serving/macro eNB 15 (dedicated carrier), the search and identification of CSG cells on the dedicated CSG carrier is left to UE implementation and algorithm design as noted above. But there will still be a need for the UE 30 to be able to report a potentially identified (and accessible) CSG cell. But the current E-UTRAN specifications do not include in the measurement configuration message 108 any way for the eNB 15 to identify the dedicated carrier. There are three exemplary embodiments given to address this case: 1) define a MeasID information element in the measurement configuration message 108 for this purpose; 2) add new field to the measurement report format (message 112) to allow for addition by the UE 30 of reporting of non-configured carriers or cells; and 3) use the existing message from the procedure of reporting CGI.

For the first case, the defined MeasID may be fixed in the controlling wireless specification for reporting identified CSG cells. Using this approach would allow for reuse of the existing MeasResultListX already defined in 3GPP TS 36.331 v8.4.0 for the MeasuredResult information element.

For the second case, potentially there would not be a need to also have the newly define MeasID information element and the new field may be, for example, neighboring measurement results group (shortened as neighbouringMeasResults) for the purpose. In a specific example, there is a list termed for simplicity measResultListCSG, which group list includes the necessary fields needed for reporting a CSG on a specific system or on any system (GSM, UTRA, EUTRA etc). Optionally, there is one group (e.g., measResultListEUTRACSG) that is defined for each different system.

In order to re-use the existing MeasResultList used in current E-UTRAN specifications for reporting of the CGI, in an exemplary embodiment the eNB 15 can configure the UE 30 for this event by using the CSG dedicated carrier in the measurement configuration message 108. When the UE reads a CGI or CSG ID which matches the CSG ID in the UEs locally stored CSG allowed list, it would trigger the UE to send a measurement report with measurement information about the CSG cell. In a particular embodiment there would be a few changes to the existing report CGI procedure and signaling to inform the UE 30 that for this particular instance it is CSG related, for example a single bit indication. To enable these implementations is defined a new event trigger such that a measurement report sending will be triggered on the UE side when an accessible CSG cell has been identified (i.e. a cell has been identified and CSG ID and/or CGI which matches an entry in the UE's locally stored CSG allowed list).

For at least the dedicated carrier case, the eNB can disable or turn off the reporting of CSG cells by the UE for the case where either or both of the UE has no CSG allowed list, or for which the PCI does not match. This helps the eNB manage the UEs' reporting to avoid duplicative measurement reports.

Figure 4:
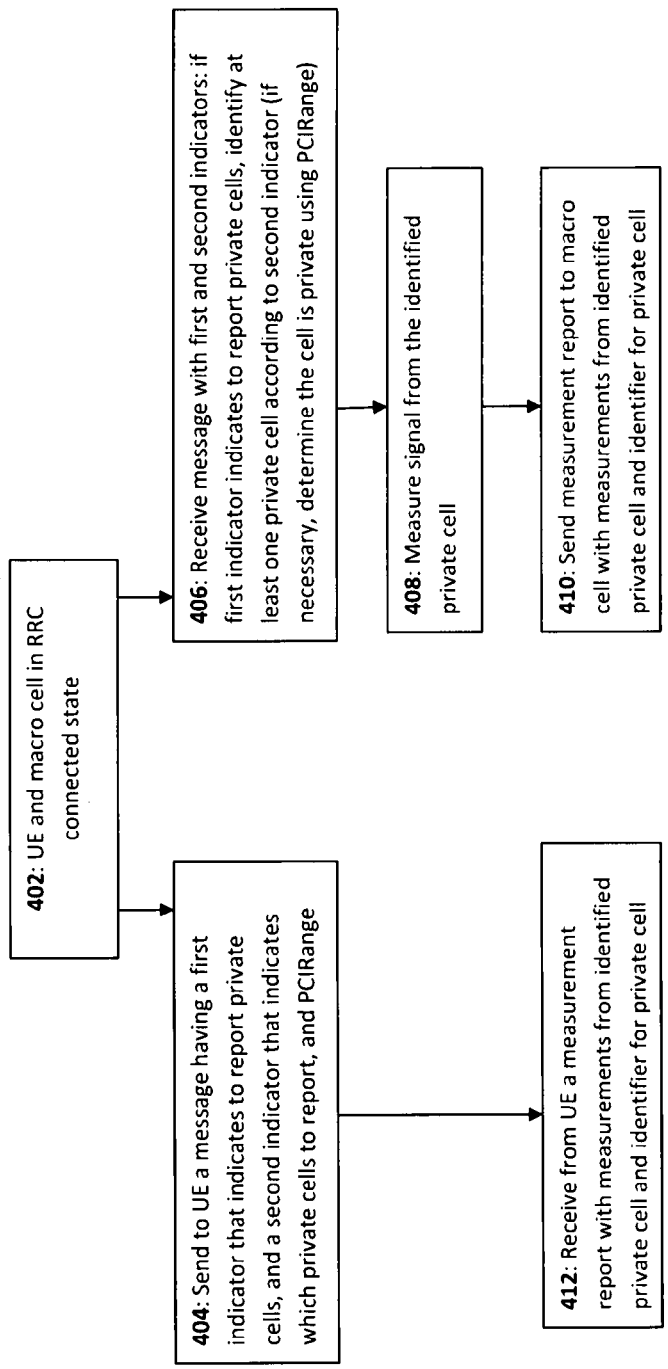
FIG. 4 is a logic flow diagram that illustrates separately the operation of a method, and a result of execution of computer program instructions embodied on a computer readable memory, in accordance with the exemplary embodiments of this invention from the perspective of a macro eNB and of a UE.

FIG. 4 is a logic flow diagram that illustrates separately for each of the macro/serving cell and the UE the operation of a method, and a result of execution of computer program instructions, in accordance with the exemplary embodiments of this invention. In accordance with these exemplary embodiments block 402 is simply the initial condition of the UE 30 and the macro cell 15 being in the RRC connected state, or more generally in a connected state that is not an idle state. From the perspective of the eNB 15, then at block 404 is sent to a UE a message that comprises a first indicator that indicates whether or not to report private cells in a measurement report and a second indicator that indicates which private cells for which measurements are to be reported. The network also sends to the UE range information for the private cell(s), which enable macro cells to be distinguished from the private cell(s). At block 412 also from the eNB's perspective is received from the UE a measurement report that comprises measurement indications from a private cell that is indicated by the second indicator. In specific embodiments, the message at block 404 is a measurement configuration message, and which also includes a PCI-Range information element that carries the range information for the CSG. In a specific embodiment, this measurement configuration message with the CSG-PCI-Range information element is sent in response to a request that is received from the UE for the PCI-Range information of the CSG.

At FIG. 4 from the perspective of the UE 30 at block 406 the UE receives from a (macro) network a message that comprises a first indicator that indicates whether or not to report private cells in a measurement report and a second indicator that indicates which private cells for which measurements are to be reported. The UE also sends to the network a request for range information for private cells and receives in response range information from the network for at least one private cell. The UE uses the received range information to distinguish private cells from other non-private (macro) cells. For the case where the first indicator indicates to report private cells, the UE uses the second indicator to identify at least one cell to report. The received range information is used to determine that the identified at least one cell is a private cell. At block 408 the UE measures a signal from the identified and determined private cell, and at block 410 the UE sends to the network a measurement report that comprises measurement indications from the identified and determined private cell. For the case where the range information (specifically, CSG-PCI-Range) is included in the message received at block 406, the UE uses the CSG-PCI-Range to distinguish private cells from non-private cells and the message, which is a measurement report configuration message, is received in response to the UE sending to the network a request for the range information.

Various more specific implementations are detailed above for the various cases of common carriers or dedicated carriers, as well as specific information elements in the message sent at block 404 and received at block 406.

So in accordance with an exemplary embodiment of the invention from the perspective of the macro eNB there is an apparatus, a method, and/or a memory storing a computer readable program of instructions that when executed by a processor result in actions comprising: sending to a UE a range indicator by which a private cell can be distinguished from a non-private cell, first indicator that indicates whether or not to report private cells in a measurement report, and a second indicator that indicates which private cells are to have their measurements reported; and receiving from the UE a measurement report that comprises a measurement indication from at least one private cell that is indicated by the second indicator.

In a specific embodiment of the apparatus/method/memory of paragraph 0038 above, the apparatus is an access node or the method is executed by an access node of an E-UTRA network, and the range indicator comprises a CSG-PCI-Range information element for the at least one private cell.

In a specific embodiment of the apparatus/method/memory of paragraph 0038 and/or 0039 above, the CSG-PCI-Range information element is in a same message with the first indicator and the second indicator.

In a specific embodiment of the apparatus/method/memory of paragraph 0038 and/or 0039 and/or 0040 above, the same message comprises a measurement configuration message which is sent to the UE in response to receiving from the UE a request for the CSG-PCI-Range information element.

And in accordance with an exemplary embodiment of the invention from the perspective of the UE there is an apparatus, a method, and/or a memory storing a computer readable program of instructions that when executed by a processor result in actions comprising: receiving from a network a range indicator for a private cell, a first indicator that indicates to report private cells in a measurement report, and a second indicator that indicates which private cells are to have their measurements reported; using the second indicator to identify at least one cell to report; using the received range indicator to distinguish private cells from non-private cells; measuring a signal from the identified at least one cell which is determined to be a private cell; and sending to the network a measurement report that comprises a measurement indication from the identified and determined at least one private cell.

In a specific embodiment of the apparatus/method/memory of paragraph 0042 above, the apparatus is a user equipment or the method is executed by a user equipment operating in an E-UTRA network in which the range indicator comprises a CSG-PCI-Range information element for the at least one private cell.

In a specific embodiment of the apparatus/method/memory of paragraph 0042 and/or 0043 above, the CSG-PCI-Range information element is received in a same message with the first indicator and the second indicator.

In a specific embodiment of the apparatus/method/memory of paragraph 0042 and/or 0043 and/or 0044 above, the same message comprises a measurement configuration message which is received in response to the UE sending to the network a request for the CSG-PCI-Range information element.

Figure 5A:
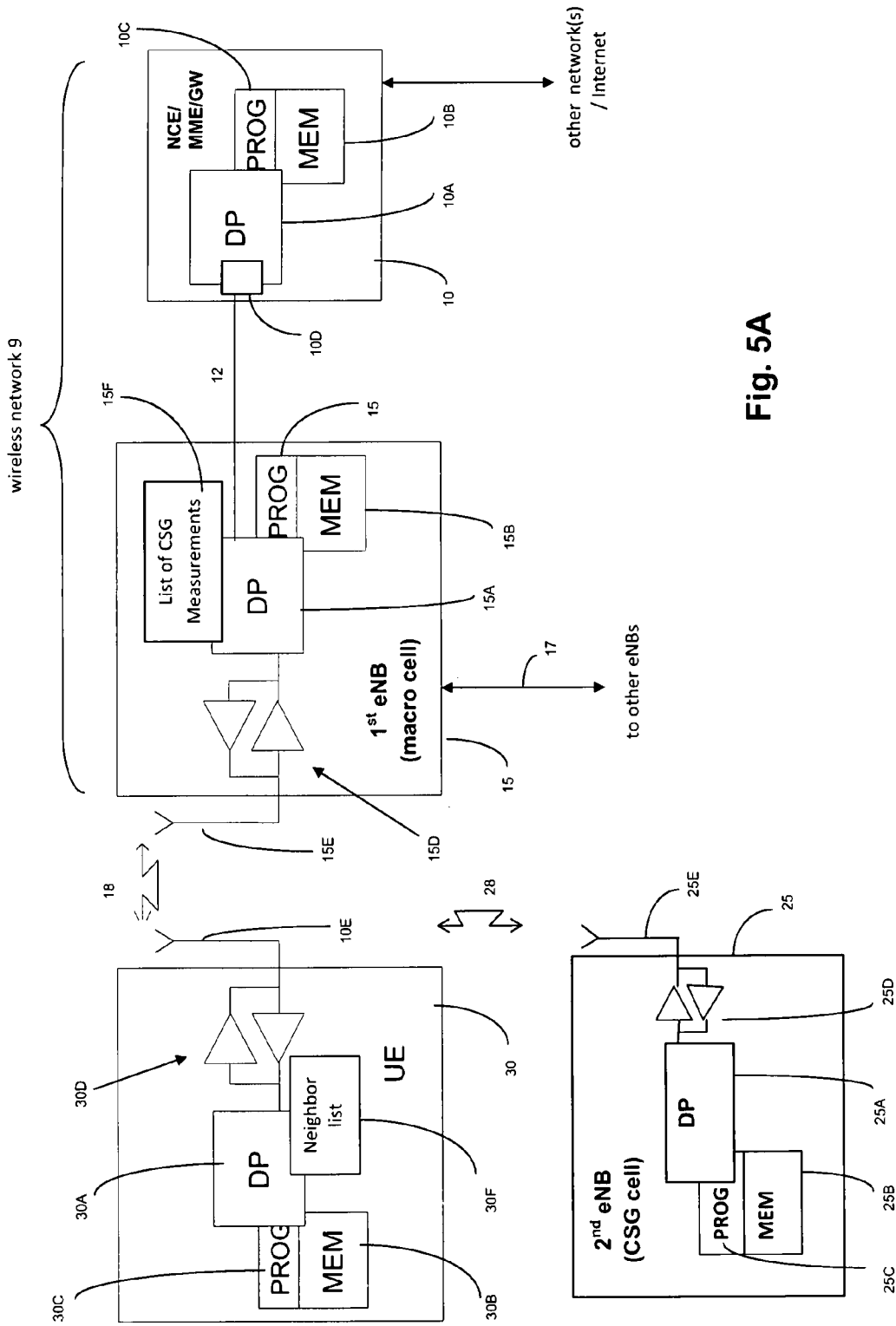
FIG. 5A is a high level block diagram of various devices used in carrying out various aspects of the invention.

Further to FIGS. 1-2 above, reference is now made to FIG. 5A for illustrating a simplified block diagram of various electronic devices that are suitable for use in practicing the exemplary embodiments of this invention. In the description of the invention below, the serving cell/macro cell is represented in FIG. 5A as the first access node/$1^{st}$ eNB (e-NodeB) and the CSG cell or private cell is represented as the second access node/$2^{nd}$ eNB. In FIG. 5A a first (non-CSG) wireless network 9 is adapted for communication with a UE 30 via a first eNB 15 over a first wireless link 18, and also a second (CSG/private) wireless subnetwork is adapted for communication with the UE 30 via a second (home) eNB 25 over a second wireless link 28. The wireless links 18, 28 are generally active only at different times, under currently typical UE implementations. The first eNB 15 may be an eNB of an E-UTRAN system or a generic base station, and may be coupled to other eNBs via a data link 17. The second eNB 25 may be compliant with the e-UTRAN standards but operating in its own CSG subnetwork apart from the macro network but physically overlapping that macro network 9.

The MME 10 provides connectivity with a further network such as a publicly switched telephone network and/or a data communications network such as the Internet. While the MME 10 is shown as controlling only one eNB 15 in the first/macro network 9, it is understood that it may control multiple macro eNBs. The term MME represents by example a network control element NCE further removed from the UE 30 than the eNB 15 which is the UE's access node, and the MME 10 may be known alternately as a gateway GW, a radio network controller RNC, or by other terms in different radio access technology networks.

The MME 10 controls the first eNB 15 through a first Iub interface 12. The Iub interface 12 may be wired or wireless, and relay nodes may also be present between either of the eNBs and the UE, such as where either network is a mesh network with fixed and/or mobile relay nodes (not shown). In such a case the relay stands in the position of the access node, from the UE's perspective. The MME 10 is coupled to a core network CN (not shown, such as a mobile switching center MSC or a Serving GPRS Support Node SGSN) through an S-1 interface as known in the art (termed an Iub interface in some other systems).

The MME 10 includes a data processor (DP) 10A, a memory (MEM) 10B that stores a program (PROG) 10C, and a modem 10D for modulating and demodulating messages sent and received over the various bidirectional interfaces. Similarly, each of the eNBs 15 & 25 include a DP 15A & 25A and a MEM 15B & 25B that stores a PROG 15C & 25C. The eNBs 15 & 25 each also include a modem for communicating with their respective RNC 10 over the Iub 12, but in FIG. 5A for clarity is shown only a suitable radiofrequency RF transceiver 15D & 25D for wireless bidirectional communication at a suitable RF using one or more antennas 15E, 25E (one shown for each), such as with the UE 30 over the links 18 & 28. The modem may be disposed within the illustrated RF transceiver. The UE 30 also includes a DP 30A, a MEM 30B for storing a PROG 30C, and a wireless transceiver 30D. At least the PROGs 15C & 30C, and in some embodiments also 25C and/or 10C, are assumed to include program instructions that, when executed by the associated DP, enable the electronic device to operate in accordance with the exemplary embodiments of this invention, as will be discussed below in greater detail.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Certain of the exemplary embodiments of this invention may be implemented at least in part by computer software stored in the local memory and executable by the DP 30A of the UE 30 and by the DP 15A of the first node B 15 (as well as the DPs 25A, 10A of the respective second eNB 15 and the MME 10 as may be appropriate in different embodiments), or by hardware, or by a combination of software and hardware (and firmware).

The various embodiments of the UE 30 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 15B, 25B and 30B may be of any type suitable to the local technical environment and may be implemented using any suitable data storage technology, such as semiconductor-based memory devices, magnetic memory devices and systems, optical memory devices and systems, fixed memory and removable memory. The DPs 10A, 15A, 25A and 30A may be of any type suitable to the local technical environment, and may include one or more of general purpose computers, special purpose computers, microprocessors, digital signal processors (DSPs) and processors based on a multi-core processor architecture, as non-limiting examples.

For the purposes of describing the exemplary embodiments of this invention the UE 30 may be assumed to also include a neighbor list 30F which may be considered as stored in the MEM 30B, and the first eNB 15 may include a private cell measurement list 15F where it stores the CSG measurements it receives from various UEs 30 and which it uses to determine which UEs it will task to further measure and report on private cells.

FIG. 5B illustrates further detail of an exemplary UE in both plan view (left) and sectional view (right), and the invention may be embodied in one or some combination of those more function-specific components. At FIG. 5B the UE 30 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 30 may have a camera 28 which is shown as being forward facing (e.g., for video calls) but may alternatively or additionally be rearward facing (e.g., for capturing images and video for local storage). The camera 28 is controlled by a shutter actuator 31 and optionally by a zoom actuator 32 which may alternatively function as a volume adjustment for the speaker(s) 34 when the camera 28 is not in an active mode.

Within the sectional view of FIG. 5B are seen multiple transmit/receive antennas 36 (shown as a single antenna 30E at FIG. 5A) that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 30 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 30 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 30 are normally powered by a portable power supply such as a battery 49.

The aforesaid processors 38, 40, 42, 44, 46, 50, if embodied as separate entities in a UE 30 or eNB 15, may operate in a slave relationship to the main processor 30A, 15A, which may then be in a master relationship to them. In a specific embodiments of this invention, measurements and potential filtering of cells is done at either the baseband chip 42 and/or at the physical layer, and the reporting rules are implemented at a higher layer such as the radio resource control layer (e.g., main processor 30A). It is noted that other embodiments may implement the invention in one or across various other chips and memories as shown or within another processor that combines some of the functions described above for FIG. 5B. Any or all of these various processors of FIG. 5B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 15, which may have an array of tower-mounted antennas rather than the two shown at FIG. 5B.

Note that the various chips (e.g., 38, 40, 42, etc.) that were described above may be combined into a fewer number than described and, in a most compact case, may all be embodied physically within a single chip.

The various blocks and signaling shown in FIGS. 3-4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN system, it should be appreciated that the exemplary embodiments of this invention are not limited for use with only this one particular type of wireless communication system, and that they may be used to advantage in other wireless communication systems such as for example GERAN, GSM, UTRAN, WCDMA, and OFDM for example.

Further, the various names used for the described parameters (e.g. MeasID, CSG, eNB, etc.) are not intended to be limiting in any respect, as these parameters may be identified by any suitable names. Further, the formulas and expressions that use these various parameters may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
   at least one processor; and
   at least one computer readable memory storing a program of computer executable instructions;
   in which the at least one processor is configured with the at least one computer readable memory and program of computer executable instructions to cause the apparatus to perform at least:
   sending to a user equipment in at least one measurement configuration message a range indicator by which a private cell can be distinguished from a non-private cell, a first indicator that indicates whether or not to report private cells in a measurement report, and a second indicator that indicates an identity filtering condition for which private cells are to have their measurements reported; and
   receiving from the user equipment a measurement report that comprises, when the first indicator indicates to report private cells, a measurement indication for at least one private cell that is in compliance with the identify filtering condition of the second indicator.

2. The apparatus of claim 1, in which the apparatus comprises an access node of an E-UTRA network and in which the range indicator comprises a CSG-PCI-Range information element for the at least one private cell.

3. The apparatus of claim 2, wherein the CSG-PCI-Range information element is sent in a same measurement configuration message with the first indicator and the second indicator.

4. The apparatus of claim 3, wherein the same message comprises a measurement configuration message which is sent to the user equipment in response to receiving from the user equipment a request for the CSG-PCI-Range information element.

5. The apparatus of claim 4, in which the measurement configuration message further comprises an indication whether a carrier frequency for the private cells whose measurements are to be reported according to the second indicator is a dedicated frequency.

6. The apparatus of claim 1, in which the second indicator directs the user equipment to report measurements on private cells whose physical cell identifier PCI matches an entry in a locally stored list of allowed private cells.

7. The apparatus of claim 1, in which the second indicator directs the user equipment to report measurements on private cells whose closed subscriber group identifier CSG-ID matches an entry in a locally stored list of allowed closed subscriber groups.

8. An apparatus comprising:
   at least one processor; and
   at least one computer readable memory storing a program of computer executable instructions;
   in which the at least one processor is configured with the at least one computer readable memory and program of computer executable instructions to cause the apparatus to perform at least:
   receiving from a network in at least one measurement configuration message a range indicator by which a private cell can be distinguished from a non-private cell, a first indicator that indicates whether or not to report private cells in a measurement report, and a second indicator that indicates an identity filtering condition for which private cells are to have their measurements reported;
   using the second indicator to filter from a plurality of cells at least one first private cell to report and at least one second private cell not to report;
   using the received range indicator to distinguish private cells from non-private cells; and
   sending to the network a measurement report that comprises, in compliance with the first and second indicators, a measurement indication for the at least one first private cell, and no measurement indication for the at least one second private cell, when the first indicator indicates to report private cells.

9. The apparatus of claim 8, in which the apparatus comprises a user equipment operating in an E-UTRA network, and in which the range indicator comprises a CSG-PCI-Range information element for the at least one private cell.

10. The apparatus of claim 9, wherein the CSG-PCI-Range information element is received in a same measurement configuration message with the first indicator and the second indicator.

11. The apparatus of claim 10, wherein the same message comprises a measurement configuration message which is received in response to the user equipment sending to the network a request for the CSG-PCI-Range information element.

12. The apparatus of claim 11, in which the measurement configuration message further comprises an indication whether a carrier frequency for the private cells whose measurements are to be reported according to the second indicator is a dedicated frequency.

13. The apparatus of claim 8, in which using the second indicator to identify the at least one cell to report comprises determining from the second indicator to report measurements on private cells whose physical cell identifier PCI matches an entry in a locally stored list of allowed private cells.

14. The apparatus of claim 8 in which using the second indicator to identify the at least one cell to report comprises determining from the second indicator to report measurements on private cells whose closed subscriber group identifier CSG-ID matches an entry in a locally stored list of allowed closed subscriber groups.

15. A non-transitory computer readable memory storing a program of computer readable instructions that when executed by at least one processor result in actions comprising:
   receiving from a network in at least one measurement configuration message a range indicator by which a private cell can be distinguished from a non-private cell, a first indicator that indicates whether or not to report private cells in a measurement report, and a second indicator that indicates an identity filtering condition for which private cells are to have their measurements reported;
   using the second indicator to filter from a plurality of cells at least one first private cell to report and at least one second private cell not to report;
   using the received range indicator to distinguish private cells from non-private cells; and
   sending to the network a measurement report that comprises, in accordance with the first and second indicators a measurement indication for the at least one first private cell, and no measurement indication for the at least one second private cell, when the first indicator indicates to report private cells.

16. The non-transitory computer readable memory of claim 15, wherein the CSG-PCI-Range information element is received in a same message with the first indicator and the second indicator.

17. The non-transitory computer readable memory of claim 16, wherein the same message comprises a measurement configuration message which is received in response to the user equipment sending to the network a request for the CSG-PCI-Range information element.

18. The non-transitory computer readable memory of claim 17, in which the measurement configuration message further comprises an indication whether a carrier frequency for the private cells whose measurements are to be reported according to the second indicator is a dedicated frequency.

19. The non-transitory computer readable memory of claim 15, wherein the range indicator, the first indicator and the second indicator are received in a measurement configuration message which is received in response to sending to the network a request for a CSG-PCI-Range information element; and in which the range indicator comprises the CSG-PCI-Range information element for the at least one private cell.

20. The non-transitory computer readable memory of claim 15, in which using the second indicator to identify the at least one cell to report comprises determining from the second indicator to report measurements on private cells whose physical cell identifier PCI matches an entry in a locally stored list of allowed private cells, or whose closed subscriber group identifier CSG-ID matches an entry in a locally stored list of allowed closed subscriber groups.

* * * * *